(No Model.)
F. W. BRAINERD.
CREAMING CAN.
No. 284,172.          Patented Sept. 4, 1883.
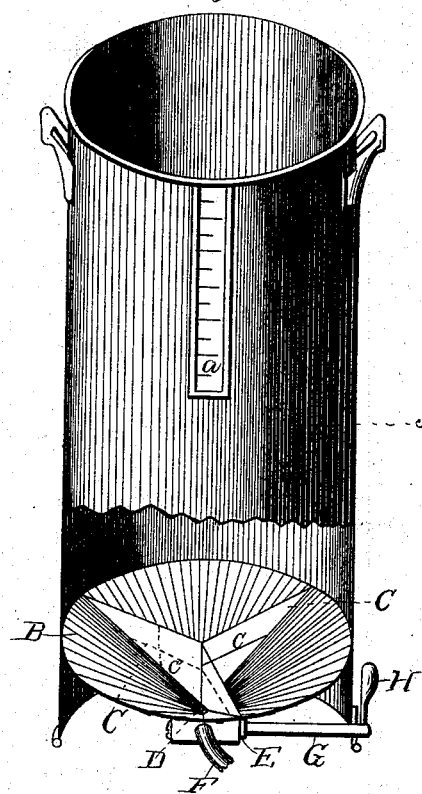
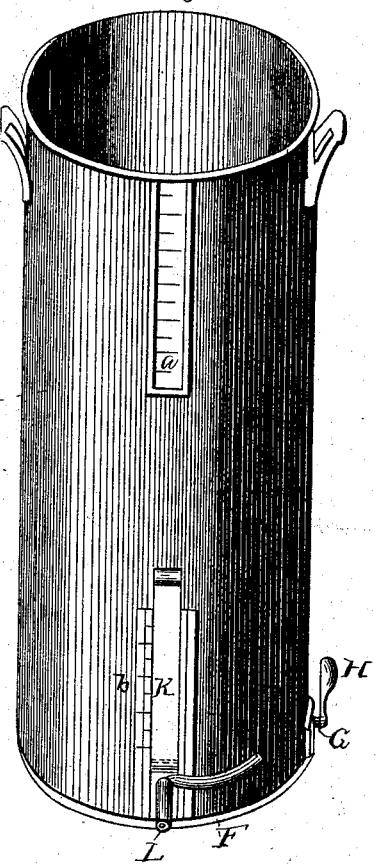
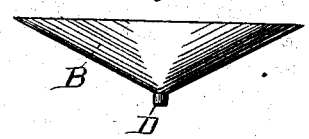
WITNESSES
W. E. Bowen
Chas. R. Burr
INVENTOR
Frank W. Brainerd
by Robt. H. Wiles.
Attorney

UNITED STATES PATENT OFFICE.

FRANK W. BRAINERD, OF FREEPORT, ILLINOIS.

CREAMING-CAN.

SPECIFICATION forming part of Letters Patent No. 284,172, dated September 4, 1883.

Application filed September 20, 1882. (No model.)

*To all whom it may concern:*

Be it known that I, FRANK W. BRAINERD, a resident of Freeport, in the county of Stephenson and State of Illinois, have invented certain new and useful Improvements in Creaming-Cans; and I do hereby declare the following to be a full, clear, and exact description of the invention, such as will enable others skilled in the art to which it pertains to make and use the same.

My invention is an improved bottom for creaming-cans of that class in which the milk and cream are separated by drawing off the milk through an opening at the bottom of the can, leaving the cream.

The object of the invention is to make a bottom of such form that the outward flow of the milk will carry off any sediment which may have been deposited at the bottom of the can, and at the same time to guard against any eddying of the milk and cream, whereby they might become mixed, or any portion of the cream drawn off with the milk. The means used to accomplish this result are shown in the accompanying drawings, in which—

Figure 1 is an elevation of a milk-can of the class named, the lower part of the front of the can being cut away to show internal construction of the bottom; Fig. 2, an elevation of same can complete; Fig. 3, a side elevation of bottom of can.

As shown in the drawings, the bottom is a right cone, B, having a short tube, D, or other opening at the vertex of the cone, and provided with three vertical wings, C, converging at the axis of the cone. These wings effectually prevent any rotary motions of the descending fluid and render any eddy impossible. They may be permanently attached to the surface of the cone or readily removable, and for convenience in cleaning the latter arrangement is preferable.

I have found in practice that the lower part of the wings may be cut away, leaving the strips above the horizontal dotted lines, as in Fig. 1, and the eddying of the milk will be prevented as effectually as if the entire wings, extending to the vertex of the cone, be used. Whether the entire wings be used or the strips at the upper edge, the parts used are rigidly connected at their line of intersection. I have also found that a single wing extending outward from the axis of the cone, or two wings in line bisecting the cone, will answer perfectly to prevent eddying; but three or more converging wings are preferable, as the structure so formed may be dropped into the bottom of the can and will hold itself in position, while if a single wing or a bisecting partition be used some means must be used to preserve its position.

The remaining details of construction of the can are evident from the drawings. A plug-faucet, D E, at the vertex of the cone is opened or closed by the lever H at the side of the can.
The milk is discharged by means of a tube, F, extending from the faucet to a slide, K, beside which is a scale, $b$. A graduated glass, $a$, at the top of the can shows the amount of cream, and by setting the bottom of the slide K at a distance from the bottom of the can equal to the amount of cream and opening the faucet, the milk runs out, leaving the cream.

I am well aware that the combination of the tube, the slide, and the scales is old, and I only show it to explain the operation of the can and of the improved bottom, which constitutes my invention.

It is evident that instead of a cone a pyramidal bottom may be used, and that either the cone or the pyramid may be either right or oblique; also, that the bottom may be a segment of a sphere or have any other curved form, so that it slopes downward from all directions to the opening sufficiently to discharge the sediment.

It is unnecessary that the wings C extend from the discharge-opening to the periphery of the bottom; but the outer ends of the wings may be cut away, as shown by the vertical dotted lines in Fig. 1.

I am aware that an arm attached to a central vertical shaft, and adapted to wipe the bottom of the can and at the same time to prevent rotary currents in the milk, has already been patented; and I do not therefore claim an arm or flange or series of flanges attached to a central or other vertical shaft; but, Having described my invention, what I claim as new, and desire to secure by Letters Patent, is—

1. A self-supporting wing or series of wings arranged, substantially as described, in the bottom of a creaming-can, and adapted to prevent the eddying of the milk as it is discharged.

2. In a creaming-can, a bottom sloping downward from all directions to the discharge-opening, in combination with a self-supporting wing or series of wings, arranged substantially as described, and adapted to prevent the eddying of the milk as it passes out of said discharge-opening.

In testimony whereof I have signed this specification in the presence of two subscribing witnesses.

FRANK W. BRAINERD.

Witnesses:
R. H. WILES,
J. A. SHEETZ.